Figures 1, 2:
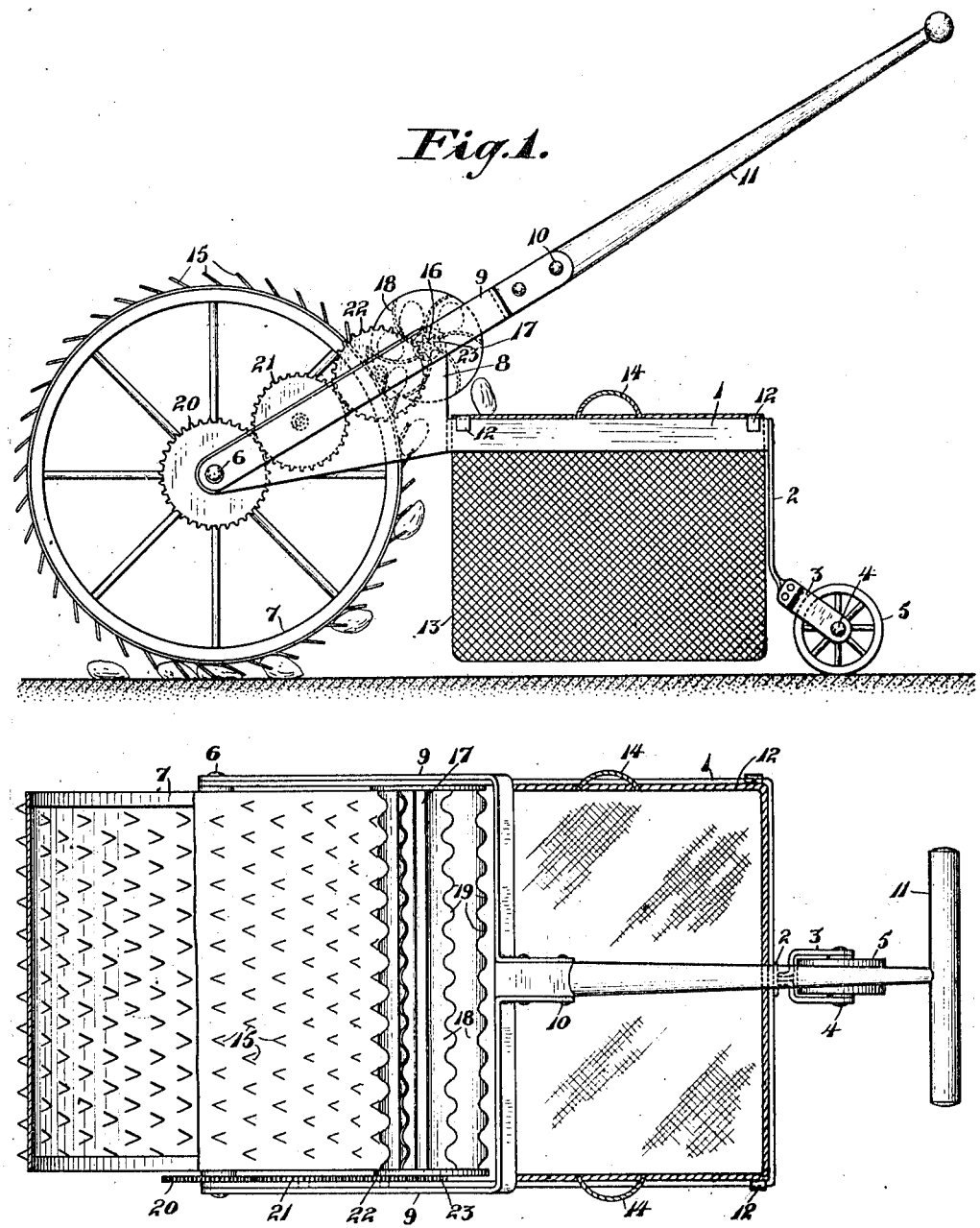

P. H. LINT.
FRUIT GATHERER.
APPLICATION FILED JUNE 22, 1911.

1,035,613.

Patented Aug. 13, 1912.

WITNESSES
F. C. Fliedner
N. B. Keating

INVENTOR
P. H. Lint,
By F. M. Wright
Atty.

UNITED STATES PATENT OFFICE.

PETER H. LINT, OF BERKELEY, CALIFORNIA.

FRUIT-GATHERER.

1,035,613.

Specification of Letters Patent. Patented Aug. 13, 1912.

Application filed June 22, 1911. Serial No. 634,827.

*To all whom it may concern:*

Be it known that I, PETER H. LINT, a citizen of the United States, residing at Berkeley, in the county of Alameda and State of California, have invented new and useful Improvements in Fruit-Gatherers, of which the following is a specification.

The object of the present invention is to provide a machine for gathering fruit.

The expense of picking fruit by hand is in many localities so great as to determine whether any profit is to be made in growing and gathering the fruit.

The object of my invention is to provide a machine by which the greater part of this expense may be saved.

In the accompanying drawing, Figure 1 is a side view of the machine; Fig. 2 is a plan view thereof, broken away in part.

Referring to the drawing, 1 indicates a rectangular open frame, secured at the rear end to an upright 2 which is connected to a fork 3, in the ends of which is mounted a shaft 4 for a wheel 5. In the front end of said frame 1 is mounted a shaft 6 of a roller 7. Pivoted on said shaft 6 are bars 9, which are secured, as shown at 10, to a handle 11. Within the rear portion of said rectangular frame is suspended, by hooks 12, a basket or receptacle 13, having handles 14 by which it may be raised from said frame.

The periphery of the roller 7 is made of sheet metal, and is formed with parallel walls of teeth 15, cut out of the sheet metal and extended outwardly all at the same inclination to the cylindrical surface of the roller. Mounted between upwardly extended front portions 8 of the frame 1 is a shaft 16, carrying a rotary transferrer 17, having curved webs 18, the edges of said webs being formed with teeth 19, which are adapted, in the rotation of the transferrer to enter between the teeth of the roller. Said rotary transferrer is operatively connected to the roller by means of a series of intermeshing gear wheels 20, 21, and 22, and a pinion 23 on the shaft of said transfer cylinder, so that said rotary transferrer rotates much more rapidly than the roller. Said gearing, and the spaces between the rows of teeth and the webs being so arranged that when a web comes into proximity to the roller, its teeth always move between teeth of the rows, adjacent to said web, of the roller. It will be observed that the teeth of the roller are arranged in staggered relation in adjacent rows, thus insuring that said teeth shall engage and pick up a prune or other fruit whatever be its position on the ground. The teeth of the webs of the transferrer are also in staggered relation in adjacent rows. The gearing is such that, as each row of teeth passes through the plane between the axes of the roller and the transferrer, one of the webs of the transferrer also passes through said plane, but at a much more rapid rate, with its teeth passed between the teeth of the roller, so that the fruit is taken off from between the teeth of the roller. Said fruit, however, is not impaled by the teeth of the webs, since these teeth are not adapted for impaling fruit. The fruit falls between the webs, and is then transferred to the receptacle 13.

The following is the operation of the apparatus as used for gathering prunes for which purpose it was originally devised. The prunes having fallen or been shaken from the tree, on to the ground the machine is wheeled over said prunes and in doing so the prunes are either collected between the teeth of the roller or impaled on said teeth, and are thereby elevated, as shown in Fig. 1, into close proximity with the rapidly rotating rotary transferrer. The teeth of this cylinder take the prunes from the roller and transfers them to the receptacle 13. By this machine, therefore, the fruit can be rapidly gathered at a very slight expense.

The utility of this machine in prune and other orchards in California and in the Pacific States generally is greatly enhanced owing to the fact that, in such localities, it is at present the general practice, before harvesting the fruit, to roll said orchards with a heavy roller of a ton or more in weight, and thus reduce the surface of said orchard to as smooth a condition as possible, this being done for the purpose of facilitating the picking and gathering of the fruit by hand. In such localities the machine is therefore very efficient in operation.

I claim:—

1. The combination of a frame, a roller mounted thereon provided on its cylindrical periphery with teeth all extending obliquely to the surface of the roller and all formed at the same angle with said surface, a rotary transferrer mounted on the frame, an operative connection between the roller and the transferrer whereby they rotate in opposite directions, but the transferrer with a more-rapid circumferential velocity than the roller, the transferrer being provided with circumferential projections so arranged that, in the motion of the transferrer, each tooth of the roller passes between two adjacent projections.

2. The combination of a frame, a roller mounted in said frame provided with parallel rows of teeth extending obliquely to the surface of the roller and all formed at the same angle with said surface, a transferrer mounted on said frame so that its periphery is in close proximity to the periphery of the roller, an operative connection between said transferrer and roller, whereby they rotate in opposite directions and with a greater peripheral speed of the transferrer than of the roller, the transferrer being formed with webs having serrated edges, said webs being arranged so that the teeth of said edges pass between adjacent teeth of the roller.

3. The combination of a frame, a roller mounted thereon and provided with rows of teeth parallel with the axis of the roller, said teeth, in adjacent rows, being arranged in staggered relation, said teeth all extending obliquely to the surface of the roller and all formed at the same angle with said surface, a transferrer rotatably mounted upon said frame formed with webs having serrated edges, spaced farther apart than the rows of teeth, the teeth of adjacent webs being likewise arranged in staggered relation to each other, an operative connection between said roller and transferrer, whereby they revolve in opposite directions but the transferrer with a greater peripheral velocity than the roller and so that each tooth of the transferrer, in the rotation of the latter, passes between adjacent teeth of the roller.

In testimony whereof I have hereunto set my hand in the presence of two subscribing witnesses.

PETER H. LINT.

Witnesses:
F. M. WRIGHT,
D. B. RICHARDS.

---

Copies of this patent may be obtained for five cents each, by addressing the "Commissioner of Patents, Washington, D. C."